UNITED STATES PATENT OFFICE.

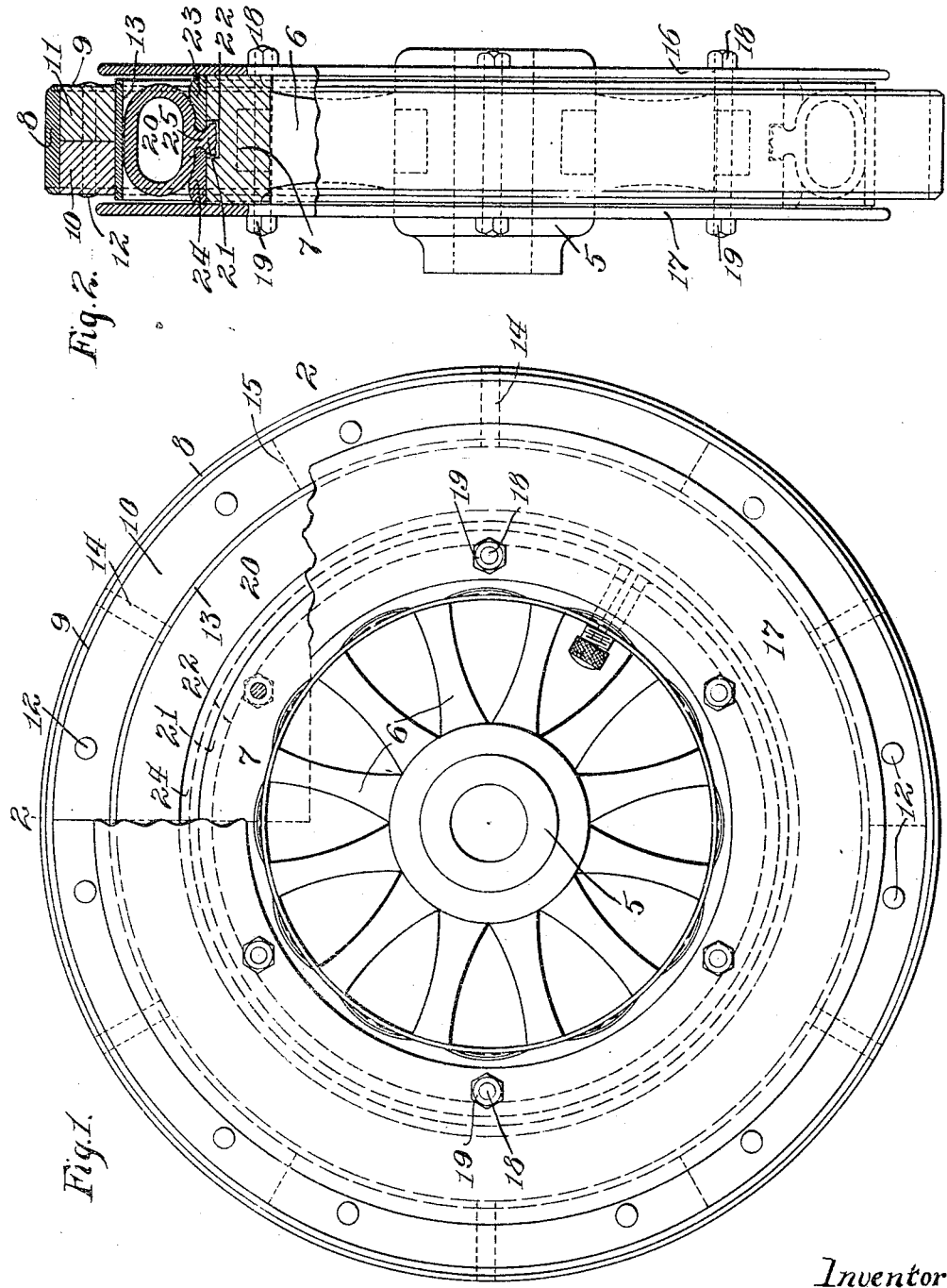

JOHN J. McINTYRE, OF HARTFORD, CONNECTICUT.

VEHICLE-WHEEL.

No. 837,709.  Specification of Letters Patent.  Patented Dec. 4, 1906.

Application filed October 28, 1905. Serial No. 284,767.

*To all whom it may concern:*

Be it known that I, JOHN J. McINTYRE, a citizen of the United States, residing in Hartford, in the county of Hartford and State of Connecticut, have invented certain new and useful Improvements in Vehicle-Wheels, of which the following is a specification.

This invention relates to vehicle-wheels, and more particularly to resilient or yielding tires for the same—that is, wheels in which the tread of the tire is elastically yieldable relatively to the axle upon which the wheel may be mounted.

The present improvement provides a relatively unyielding and wear-resisting tread for engaging the ground and a cushion beneath such tread and interposed between it and the proper felly of the wheel.

The improvement also relates to certain means whereby the tread or outer tire may be disassembled from the wheel and the cushion portion removed, as for repairs or otherwise, as occasion may demand.

In the drawings accompanying and forming a part of this specification, Figure 1 is a side view of a wheel embodying my present improvements, certain portions of the wheel being shown as broken away to reveal the relation of other parts lying beyond; and Fig. 2 is an edge view of the wheel, cut away, however, at about the line 2 2 of Fig. 1, thus making a partial longitudinal section.

The wheel as herein illustrated comprises a hub portion 5, having some suitable spokes 6 radiating therefrom, and which spokes are set into a felly 7, in the present instance illustrated as made of wood. The tread portion of the wheel is shown as comprising a tire 8, which may be made of metal or other wear-resistant material. The tire 8 is shown as carried by what may be termed a "felly" 9, in the present instance made of two portions of wood 10 and 11, fastened together by rivets 12 passing through them, and the inner face of the felly 9 is provided with a metal band 13, which may be secured to the felly 9 and to the tire 8 by some suitable means—as, for instance, rivets 14. The felly 9 will generally be made up of a number of segments, the abutting ends of which are indicated by the dotted lines 15 in Fig. 1. This, however, is merely mentioned incidentally. The felly 7 is shown as carrying two flanges in the nature of plates 16 and 17, secured to it by suitable bolts 18.

The flange or plate 17 may be removed by unscrewing the nuts 19 and removing the plate, which will then permit the removal of the tread portion and also the resilient or elastic portion, here shown as an inflatable body 20, which from resemblance to an inflatable tire is so designated throughout this present description, although a cushion effect is the desideratum and a part of the present invention, which tire is shown as resting upon the band 13 and having a web portion 21 entering a peripheral groove 22 in the felly 7. The inflatable tire is shown as resting at its inner portion—that is, the portion directed toward the axis of the wheel—upon plates 23 and 24, which may be regarded as tires for the felly 7. These tire-sections are formed on their faces which engage the inner periphery of the inflatable tire to correspond in conformation thereto, and the tire 23 may be shrunk or suitably secured to the felly 7, thus to hold the same in position, and the tire 24 may be removable therefrom, so that upon the removal of the plate 17 the tire 24 may be removed to facilitate the removal of the inflatable tire. Thus it will be seen that the inflatable tire acts as a cushion between the felly proper and the tire proper or tread 8 of the wheel.

The plates 16 and 17 act as guides for the outer tire portion, and the band 13 may be made wider than the felly 9 to occupy substantially all the space between the plates 16 and 17, which will act as guides for the band 13, against which band the outer portion or perimeter of the inflatable tire 20 will rest. The inner face of the band 13 constitutes a track, as it were, upon which the elastic tire 20 will run, and since the tread portion of the wheel will move relatively to the elastic tire there will be a certain amount of friction which will be minimized to the advantage of the said elastic tire by the employment of the metal band, the face of which will preferably be made smooth.

In securing the plates 16 and 17 to the felly 7 they may press the plates or tires 23 and 24 against the neck 25 of the flange 21, and thereby prevent the inflatable tire from creeping relatively to the felly 7. The tire tread portion is free to move angularly upon its axis independently of the wheel, which it will do as the elastic or cushion tire is depressed at the tread during the rotation of the wheel when in use.

Having described my invention, I claim—

1. The combination with a vehicle-wheel having a felly, of a sectional tire fast thereon, a sectional tire loose thereon and mounted for leaving a channel between the edges of these, an inflatable tire having a flange located in such channel, guide-plates secured to the sides of the felly and projecting beyond the same and having guide-faces, and a felly and tire outside of such inflatable body and guided by said plates.

2. The combination with a vehicle-wheel having a felly, a centrally-disposed channel within the perimeter thereof, a sectional tire fast with the felly upon one side of such channel and a sectional tire loosely mounted upon the felly upon the other side of such channel, an elastic body having a web disposed in such channel, a wear-resisting tire outside of such elastic body, and plates secured to the felly inclosing said elastic body, acting as guides for said tire and for pressing said sectional tires upon the flange of said inflatable body.

3. The combination with a vehicle-wheel, of a tire thereon having a seat, an elastic tire resting on said seat, a tread portion supported by said elastic tire and comprising a wooden felly, a metal tire upon the outer side thereof, and a metal band upon the inner side of said wooden felly and surrounding said elastic tire.

4. The combination with a vehicle-wheel having a felly, a tire thereon comprising two sections divided in a plane perpendicular to the axis of the wheel, an inflatable tire mounted thereon, said sectional tires conforming in shape to the inner face of said inflatable tire, a wear-resisting tire outside of said inflatable tire and free from the same, and plates carried by said felly for holding said sectional tire in place and guiding said wear-resisting tire.

5. The combination with a vehicle-wheel, of an elastic tire mounted thereon, and a tread portion mounted on said elastic tire and embodying a tire, a felly made up of two sections united on a plane perpendicular to the axis of the wheel, and an inner band upon said felly and affording an engaging surface for said elastic tire.

6. The combination with a vehicle-wheel having a felly, of a tire having two sections mounted upon said felly, an inflatable tire having a portion located between the sections of said tire, plates secured to said felly and engaging said sections and projecting beyond the inflatable tire and having guide-faces, and a tread portion outside of said inflatable tire and guided by said plates.

JOHN J. McINTYRE.

Witnesses:
CARRIE B. TREAT,
HENRY BISSELL.